April 26, 1955  E. F. HOEPKER  2,706,929
MULTIPLE EGG CANDLER
Filed June 18, 1952  2 Sheets-Sheet 1
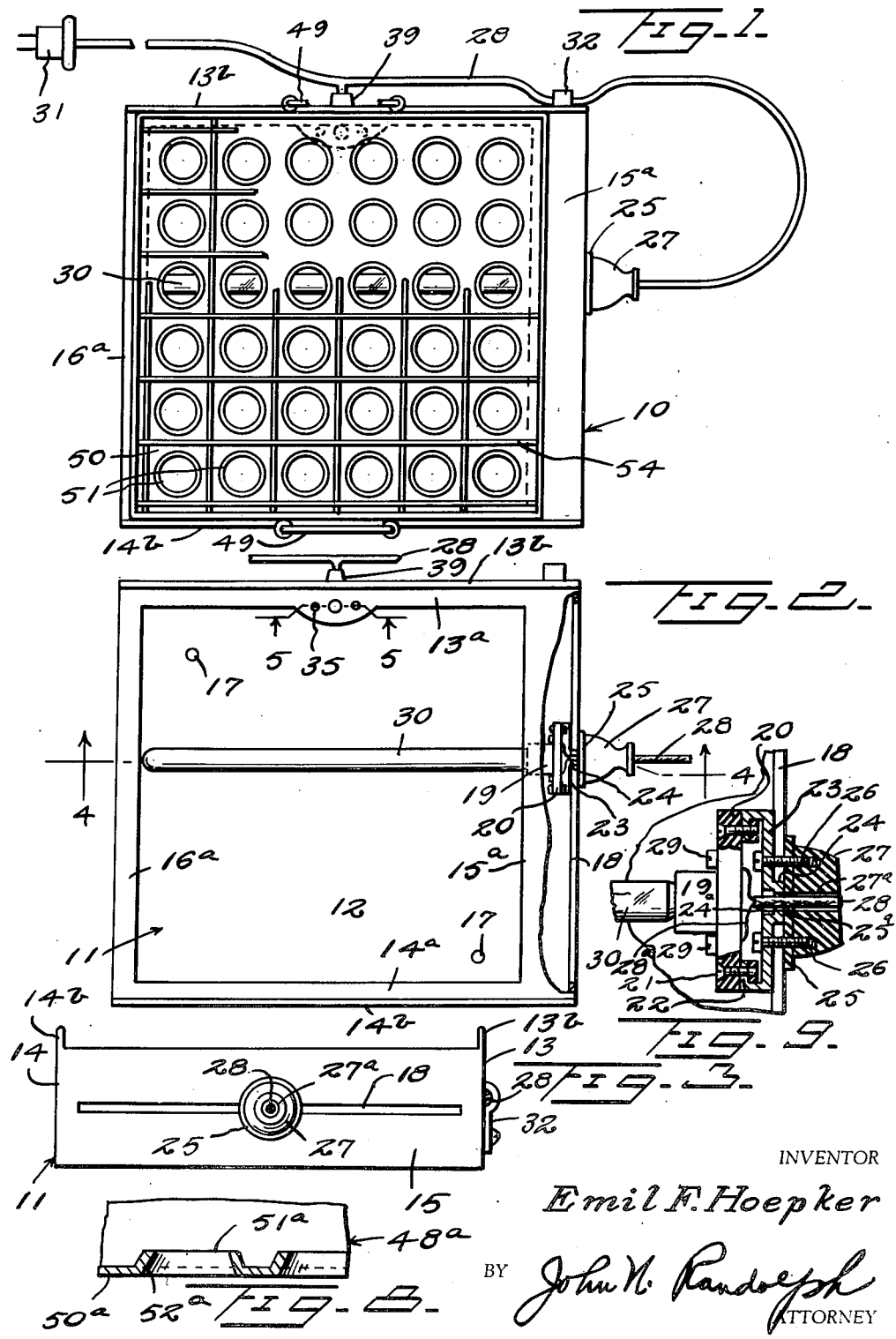
INVENTOR
Emil F. Hoepker
BY John N. Randolph
ATTORNEY April 26, 1955
E. F. HOEPKER
2,706,929
MULTIPLE EGG CANDLER
Filed June 18, 1952
2 Sheets-Sheet 2
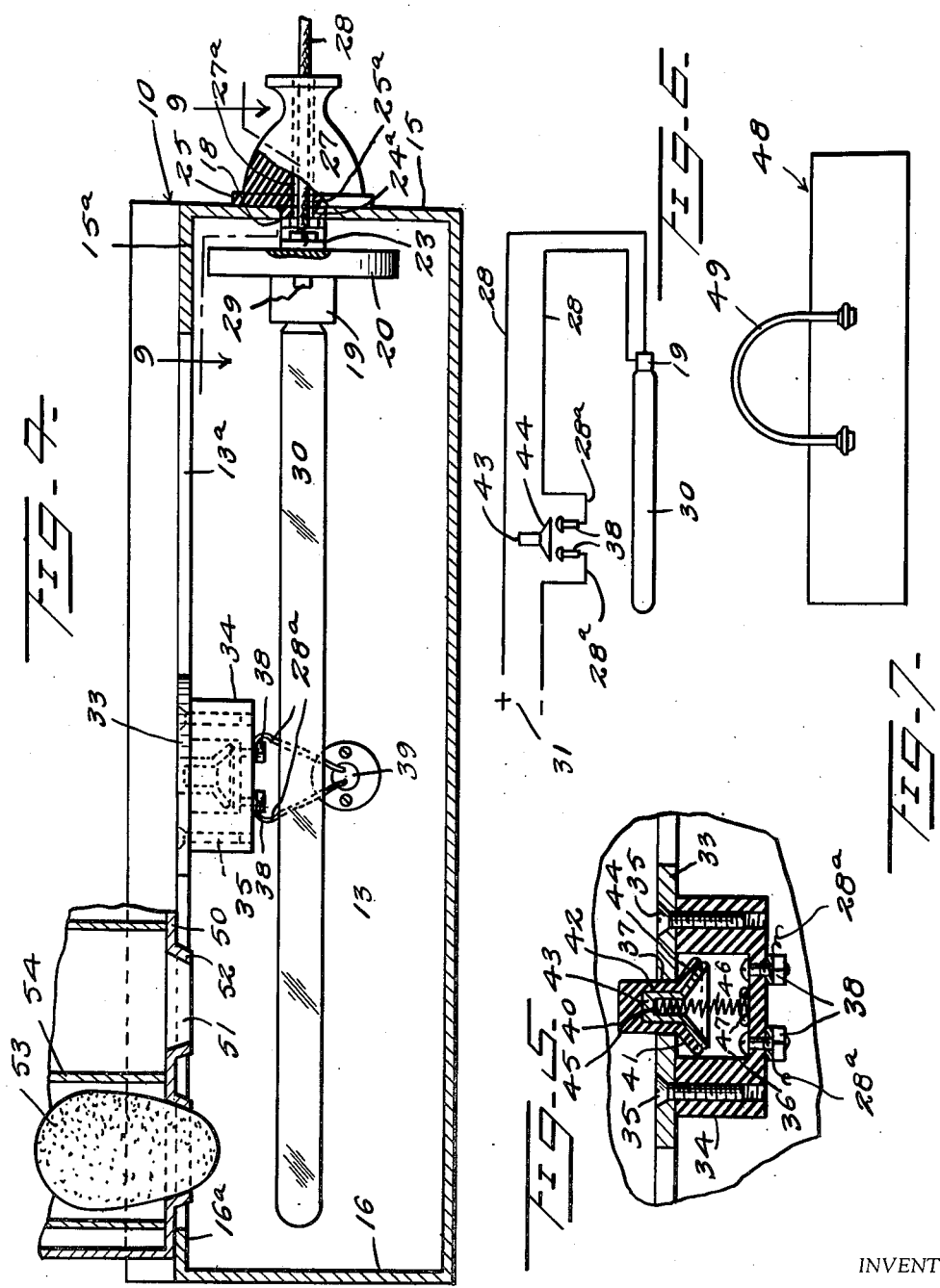
INVENTOR
Emil F. Hoepker
BY John H. Rudolph
ATTORNEY

2,706,929

MULTIPLE EGG CANDLER

Emil F. Hoepker, Addieville, Ill.

Application June 18, 1952, Serial No. 294,229

1 Claim. (Cl. 88—14.91)

This invention relates to novel apparatus for use in candling eggs and more particularly to a unit whereby three dozen eggs may be very rapidly candled in a single operation without manually touching the eggs except to remove a defective egg from the candling apparatus, thereby eliminating the breakage of eggs, particularly those having soft shells, which commonly occurs in candling eggs in a conventional manner where the eggs are individually handled.

Still a further object of the invention is to provide an egg candler wherein a plurality of eggs may be simultaneously candled thus enabling defective eggs to be readily and more accurately noted by comparison with other, non-defective eggs being simultaneously candled.

Still a further important object of the invention is to provide an egg candling apparatus wherein six eggs are simultaneously illuminated by a movable light source and wherein said light source may be moved to position it beneath different rows of six eggs each for rapidly and efficiently candling six eggs at a time and a total of thirty-six eggs at each operation.

Still another object of the invention is to provide an egg candling apparatus wherein the light source is automatically de-energized after completion of the candling operation and the removal of the egg supporting section from the remainder of the apparatus, and wherein the light source is again automatically re-energized when another group of eggs to be candled is disposed in a position for candling, thereby effecting a material saving in electric current.

Still a further object of the invention is to provide an egg candling apparatus which will save considerable time in candling eggs while at the same time enabling the eggs to be more efficiently and accurately candled.

Various other objects and advantages of the invention will hereinafter become more fully apparent from the following description of the drawings, illustrating a presently preferred embodiment thereof, and wherein:

Figure 1 is a top plan view, partly broken away, illustrating the apparatus in an operative position;

Figure 2 is a top plan view partly in section of the apparatus but with the egg supporting tray removed therefrom;

Figure 3 is an end elevational view looking from right to left of Figure 2;

Figure 4 is an enlarged longitudinal vertical sectional view taken substantially along a plane as indicated by the line 4—4 of Figure 2 and with a portion of an egg supporting tray shown in an applied position;

Figure 5 is an enlarged vertical sectional view taken substantially along a plane as indicated by the line 5—5 of Figure 2;

Figure 6 is a diagrammatic view of the electric circuit of the light source;

Figure 7 is an end elevational view of the egg tray of the candling apparatus;

Figure 8 is a fragmentary vertical sectional view of a portion of a slightly modified egg tray, and Figure 9 is a fragmentary horizontal sectional view taken substantially along a plane as indicated by the line 9—9 of Figure 4.

Referring more specifically to the drawings, the novel egg candling apparatus in its entirety is designated generally 10 and as best illustrated in Figures 2, 3 and 4 includes an open top receptacle 11 forming a base thereof and having a bottom 12, upstanding side walls 13 and 14 and upstanding end walls 15 and 16, all of which walls are fixed to and rise from the bottom 12. The walls, 13, 14, 15 and 16 are provided with inturned flanges 13a, 14a, 15a and 16a, respectively, at their upper edges, forming tray supporting flanges, as will hereinafter become apparent. The side walls 13 and 14 are additionally provided with upstanding extensions 13b and 14b which extend upwardly from the outer edges of the flanges 13a and 14a, respectively, and which form side retaining flanges for an egg supporting tray, hereinafter to be described. The bottom 12 is provided with openings 17 to receive fasteners, not shown, such as wood screws, by means of which the base 11 may be rigidly secured to any suitable supporting surface, not shown.

As best seen in Figure 3, the end wall 15 is provided with a slot 18 which extends to adjacent the ends thereof. A lamp bulb socket 19 has a base 20 which is secured by fastenings 21 to turned back apertured ears 22 of an inner slide plate 23 which is disposed against the inner face of the end wall 15 and which is provided with an outwardly offset centrally disposed portion 24 which is horizontally elongated to slidably and nonrotatably fit the slot 18. The outer surface of the projection 24 abuts against an outer slide plate 25 which is secured to the inner slide plate 23 by fastenings 26. The outer slide plate 25 is disposed against the outer face of the end wall 15 and said slide plates 23 and 25 are spaced apart a sufficient distance by the projection 24 to prevent binding engagement of the slide plates with the wall 15 and so that said connected slide plates carrying the socket 19 may slide in the slot 18 longitudinally of the wall 15 from adjacent one end thereof to adjacent the opposite end. A knob 27, preferably formed of electrical insulating material, is secured against the outer side of the outer slide plate 25 by the fastenings 26 which extend therethrough and are detachably secured in said knob 27. The knob 27 has a bore 27a extending longitudinally therethrough which registers with registering openings 25a and 24a of the slide plate 25 and projection 24, respectively, to accommodate the encased portion of electrical conductors 28 which extend through the bore 27a and openings 25a and 24a and the exposed terminals of which are secured to binding posts 29 of the lamp socket 19, which binding posts are mounted in the base 20 which is preferably formed of electrical insulating material. The binding posts 29 suitably connect the conductor ends 28 to the two contacts of the socket 19 for providing electric current to an elongated lamp bulb 30 which is mounted in the socket 19 and which extends therefrom to adjacent the end wall 16, as best illustrated in Figure 2.

The conductors or electric cord 28 is provided at its opposite end with a conventional electric plug 31 which is adapted to be plugged into a conventional electrical outlet, not shown. A portion of the electric cord 28 is clamped against the side wall 13 by a clamp 32 which is fastened thereto adjacent the end wall 15 to provide sufficient slack in the electric cord between the clamp 32 and knob 27 to enable said knob with the socket 19 and lamp bulb 30 to slide relatively to the wall 15 from adjacent the side wall 13 to adjacent the side wall 14.

The flange 13a is provided with an inwardly extending projection or enlargement 33 to the underside of which a switch housing of electrical insulating material 34 is secured as by fastenings 35. The housing 34 is provided with an upwardly opening cavity 36 which registers with a restricted opening 37 of the enlargement 33. A pair of binding posts 38 are mounted in the bottom portion of the housing 34 and have upper ends disposed in the cavity 36 and lower ends disposed beneath the housing 34. One of the conductors 28, which may be assumed to be the negative conductor of the electric cord is provided between the plug 31 and clamp 32 with a break therein and the adjacent end portions 28a defining said break or gap extend inwardly of the base 11 through a boss 39 in the side wall 13 and have exposed terminals which are secured to the contact posts 38 beneath the housing 34, as best illustrated in Figure 5.

A push button 40 of electrical insulating material is slidably mounted in and extends upwardly through the opening 37 of the flange extension 33 and is provided with an annularly flared lower portion 41 which is loosely disposed in the cavity 36 and which is larger than the opening 37 to limit upward movement of the button 40 in said opening 37. The button 40 including its flange or enlargement 41 has a hollow interior forming a socket 42 which contains a lining member 43 of electrical conductor material and which is likewise provided with a flared annular bottom portion 44 disposed beneath the flared portion 41. The member 43 including its flange 44 is likewise hollow to define a downwardly opening socket 45 in which is seated the upper end of an expansion coiled spring 46, the lower end of which engages the bottom of the cavity 36 between the contact posts 38 and is preferably confined against lateral displacement by an upstanding annular ridge 47 of the housing 44 in which the bottom convolutions of the spring 46 are disposed and held against lateral displacement. The spring 46 urges the button 40 and conductor bridge 43 upwardly so that the conductor bridge portion 44 is spaced a substantial distance above the upper ends of the contact posts 38 which are disposed in the cavity 36 and the button 40 extends to substantially above the upper surface of the flange extension 33. With the switch parts thus disposed, as illustrated in Figure 5, it will be readily apparent that the light bulb 30 will be de-energized, assuming that the plug 31 is connected to an electrical outlet, since the insulated contact posts 38 to which the conductor portions 28a are connected define a gap in the electric circuit between the plug 31 and lamp socket 19, as illustrated diagrammatically in Figure 6. However, by pressing downwardly on the button 40 the flared portion 44 will be brought into contact with the upper ends of the two contact posts 38 for bridging the gap therebetween to thereby close the circuit for energizing the light bulb 30.

The egg candling apparatus 10 also includes a novel egg tray, designated generally 48, including an open top receptacle the opposite side or end walls of which are provided with bail-type handles 49 which are preferably of flexible construction. The open top receptacle forming the tray 48 is provided with a bottom 50 which is preferably formed of cardboard and which is preferably provided with thirty-six equally spaced flanged openings 51, each of which is defined by a downwardly extending, downwardly tapered annular frusto-conical flange 52 forming an integral part of the bottom 50. The flanged openings of the bottom 50 are adapted to each receive therein the restricted end of an egg, one of which eggs mounted in one of said flanged openings is illustrated in Figure 4 and designated 53. The openings of the bottom 50 are arranged in six rows each of which contains six of said openings so that three dozen eggs 53 may be mounted in the tray 48. A conventional separator 54 may be mounted in the tray 48 having a compartment to surround each of the openings 51 thereof for separating the eggs 53 while contained in said tray. The tray 48 is sized to fit between the upstanding retaining flanges 13b and 14b which function to center the tray over the open top of the base 11 and portions of the bottom 50 spaced outwardly from the flanged openings 51 rest upon the base flanges 13a, 14a, 15a and 16a, as illustrated in Figure 1, so that all of the flanges 52 are disposed in the open top of the base 11 between said flanges 13a, 14a, 15a and 16a, as seen in Figure 1. It will also be apparent that when the tray 48 is placed on the base 11, a portion of its bottom 50 will rest upon the flange extension 33 and said portion will engage the push button 40 to displace it downwardly from its position of Figure 5 into its position of Figure 4 so that, assuming the plug 31 to be connected to an electrical outlet, as soon as the tray 48 filled with three dozen eggs is applied to the base 11, as previously described, the electric circuit will be thereby completed to the light bulb or source 30 so that the light source will be energized. As clearly illustrated in Figure 1, the light source 30 will be simultaneously disposed beneath six openings 51 constituting a row of openings disposed parallel to the side walls 13 and 14 so that the six eggs mounted in said openings may be quickly viewed and candled and readily compared to easily determine if a defective egg exists among the six eggs being simultaneously candled, in which case the defective eggs may be removed while the other, perfect eggs need not be manually touched during the candling operation. It will also be apparent that the knob 27 can be grasped manually for moving the light source 30 from adjacent one side wall 13 or 14 to the other side wall, momentarily stopping the light source beneath each row of eggs 53, to thereby quickly and accurately candle the three dozen eggs contained in the tray 48. It will also be apparent that the light source 30 will be automatically de-energized after the three dozen eggs contained in the tray 48 have been candled when said tray is lifted off of the base 11, so that a considerable saving in electric current will result since the light source will be energized only while the eggs are actually being candled and which may be much more quickly accomplished than in the conventional manner of candling eggs individually.

Figure 8 illustrates a portion of a slightly modified form of tray 48a and wherein the tray bottom 50a is provided with integral upstanding upwardly tapered frusto-conical flanges 52a defining the egg receiving openings 51a and in which the eggs are supported in upright positions with the smaller ends of the eggs engaging in the openings 51a. A filler or divider 54 may likewise be used with the tray 48a.

Various other modifications and changes are contemplated and may obviously be resorted to, without departing from the spirit or scope of the invention as hereinafter defined by the appended claim.

I claim as my invention:

An egg candling apparatus comprising a base having flanges constituting a top portion of the base and defining a relatively large opening in said top portion, said base having a wall extending downwardly from said top portion provided with a slot extending substantially from end-to-end thereof, a light source support including an inner section having an inwardly opening lamp socket mounted on the inner side of said wall and an outer section including a knob mounted on the outer side of said wall, said light source support including a portion disposed in and slidably engaging said slot for slidably supporting the light source support solely on the wall for movement only longitudinally thereof, connecting means extending loosely through the slot and detachably connecting said inner and outer sections, an elongated light source having one end mounted in said socket and extending therefrom substantially across the opening of the top of the base, said light source being supported solely by the lamp socket below the top of the base and being movable with the light source support substantially across said top opening at right angles to the axis of the light source, means supporting a plurality of rows of eggs to be candled in an exposed position above the opening of the base top, said means resting on the base top around said opening and supporting the eggs in rows disposed parallel to the light source whereby the light source will simultaneously illuminate all of the eggs of a row of eggs beneath which the light source is supported for simultaneous candling thereof, said light source being slidably movable in the base for selectively positioning the light source beneath each of the rows of eggs, said light source support including an inner slide plate detachably connected to the lamp socket and slidably disposed against the inner side of said base wall, said inner slide plate having an outwardly offset boss extending outwardly through and slidably disposed in the slot and constituting said light source support portion, an outer slide plate, said first mentioned means connecting the inner slide plate to the outer slide plate and knob and positioning the outer slide plate in slidable engagement with the outer side of said wall, said boss engaging the outer slide plate and being of a length equal to the thickness of the wall to prevent binding engagement of the slide plates with the wall.

References Cited in the file of this patent

UNITED STATES PATENTS

| | | |
|---|---|---|
| 1,055,900 | Grant | Mar. 11, 1913 |
| 1,088,505 | Winslow | Feb. 24, 1914 |
| 1,097,446 | Klass | May 19, 1914 |
| 2,144,657 | Harbison | Jan. 24, 1939 |

FOREIGN PATENTS

| | | |
|---|---|---|
| 641,210 | Great Britain | Aug. 9, 1950 |